(12) United States Patent
Shuen

(10) Patent No.: US 6,488,159 B2
(45) Date of Patent: Dec. 3, 2002

(54) TELESCOPIC HANGING RACK STRUCTURE

(75) Inventor: Shun-Tian Shuen, San Chung (TW)

(73) Assignee: Janchy Enterprise Co., Ltd., Taipei (TW)

( * ) Notice: Subject to any disclaimer, the term of this patent is extended or adjusted under 35 U.S.C. 154(b) by 0 days.

(21) Appl. No.: 09/837,469

(22) Filed: Apr. 19, 2001

(65) Prior Publication Data

US 2002/0153337 A1 Oct. 24, 2002

(51) Int. Cl.[7] ................................................. A47H 1/00
(52) U.S. Cl. ...................... 211/123; 211/105.3; 248/251
(58) Field of Search ............................... 211/123, 105.1, 211/105.3, 105.4, 105.2, 182, 60.1; 248/251, 214–215, 65, 72, 352, 353, 354.1; 285/330, 303, 188; 403/167, 286, 341, 360, 376–377, 177

(56) References Cited

U.S. PATENT DOCUMENTS

| | | | | |
|---|---|---|---|---|
| 2,969,881 A | * | 1/1961 | Lilly | 211/105.1 |
| 2,974,806 A | * | 3/1961 | Seewack | 211/105.3 |
| 3,687,499 A | * | 8/1972 | Guilfoyle, Sr. | 287/127 R |
| 3,891,091 A | * | 6/1975 | Anderson | 211/105.3 |
| 3,965,540 A | * | 6/1976 | Moore | 24/255 |
| 4,209,099 A | * | 6/1980 | Wickes | 211/182 |
| 4,548,328 A | * | 10/1985 | Brauning | 211/205 |
| 4,635,889 A | * | 1/1987 | Bell et al. | 248/265 |
| 4,700,918 A | * | 10/1987 | Andrasko, Jr. | 248/251 |
| 4,821,818 A | * | 4/1989 | Mefferd | 285/330 |
| 4,971,210 A | * | 11/1990 | Blumenkranz et al. | 211/123 |
| 5,014,954 A | * | 5/1991 | Merl | 211/105.3 |
| 5,269,572 A | * | 12/1993 | Mefferd | 285/330 |
| 5,303,832 A | * | 4/1994 | Tu | 211/105.4 |
| 5,480,193 A | * | 1/1996 | Echols et al. | 285/45 |
| 5,492,295 A | * | 2/1996 | Remmers | 248/251 |
| 5,642,818 A | * | 7/1997 | Brent et al. | 211/123 |
| 5,810,180 A | * | 9/1998 | Chan | 211/117 |

FOREIGN PATENT DOCUMENTS

NL 71755 * 2/1953 ................. 211/123

* cited by examiner

Primary Examiner—Blair M. Johnson
Assistant Examiner—Jennifer E. Novosad
(74) Attorney, Agent, or Firm—Bacon & Thomas, PLLC

(57) ABSTRACT

A telescopic hanging rack structure. The structure includes a first bar, a second bar and a coupling unit. The outer faces of the first and second bars are formed with axial locating ribs which are cut with multiple notches at equal intervals. The outer ends of the first and second bars are connected with hanging hooks via circular adapters. The coupling unit includes left and right casings mated and locked with each other by screws. The inner wall faces of the left and right casings are respectively formed with two-stage recesses with different curvatures, such that after the first and second bars are fitted with each other, the first and second bars are firmly inserted and located in the left and right casings.

4 Claims, 7 Drawing Sheets

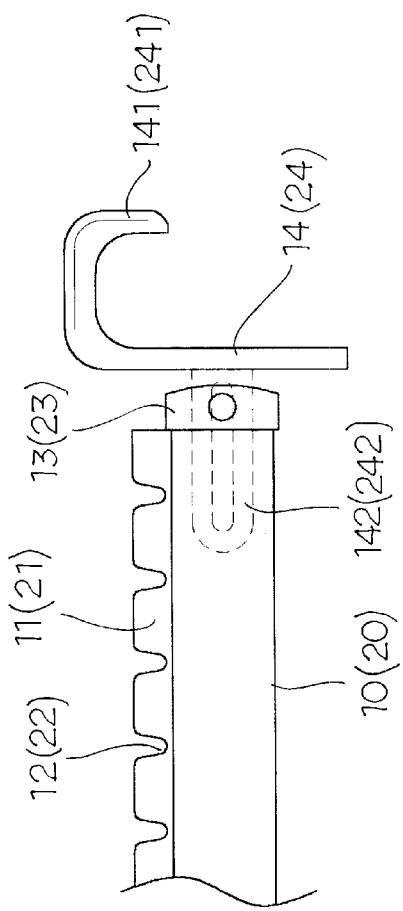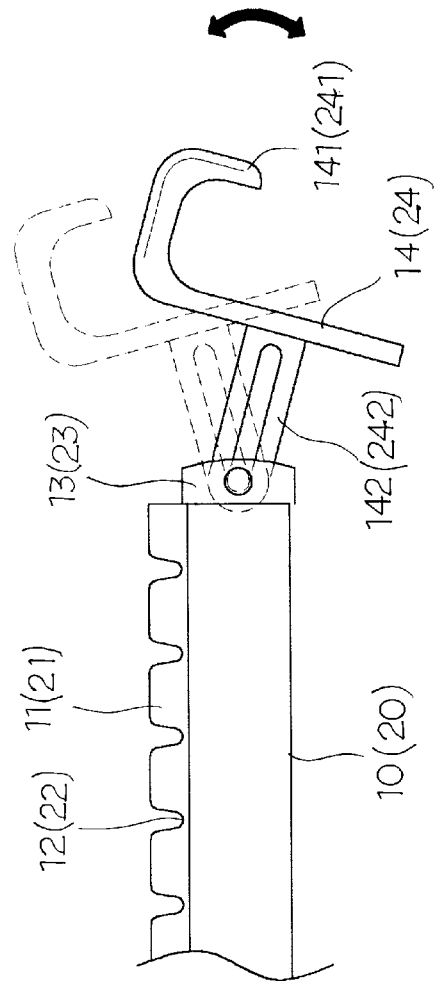

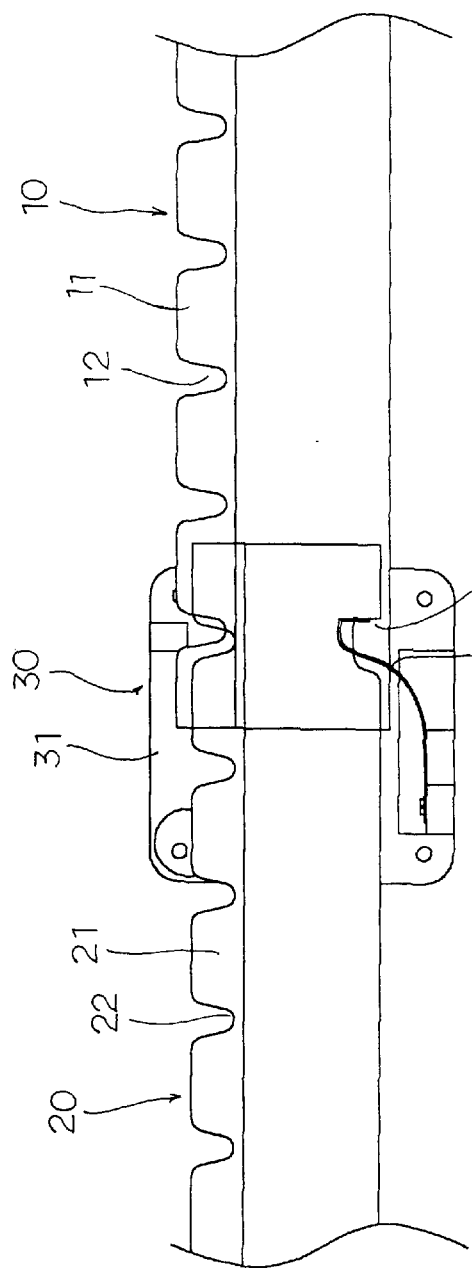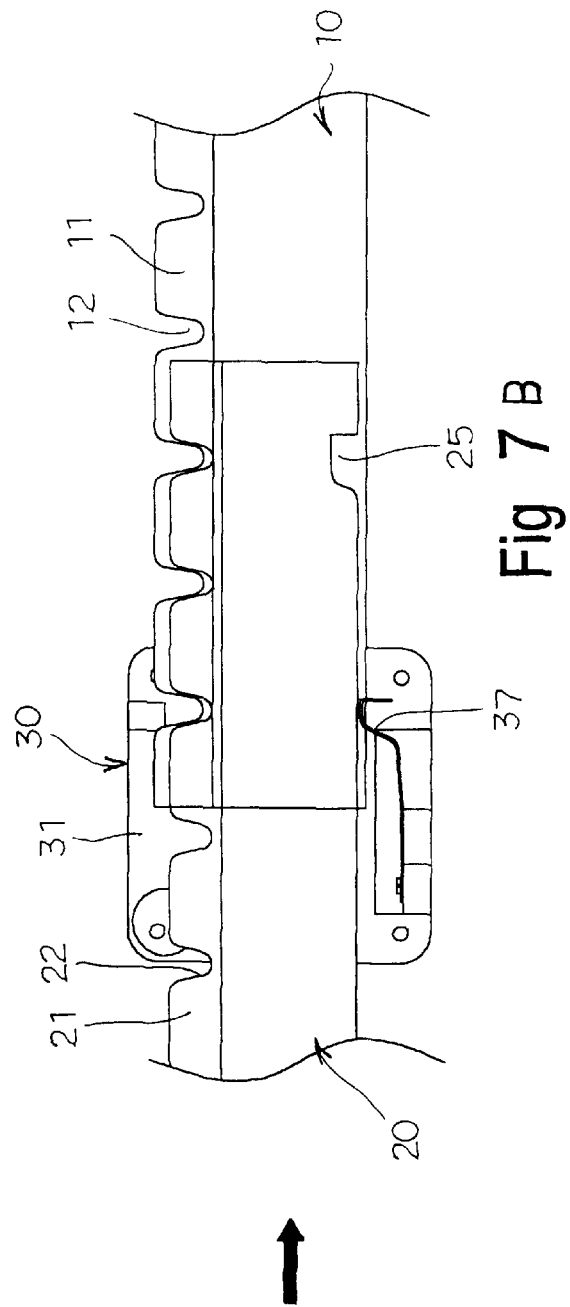

TELESCOPIC HANGING RACK STRUCTURE

BACKGROUND OF THE INVENTION

The present invention is related to a telescopic hanging rack structure which can be easily adjusted in. length for conveniently hanging articles thereon.

A conventional hanging hook or U-shaped rack with fixed length is used to hang a clothes or towel thereon. Also, a conventional telescopic hanging rack composed of two bars is used to hang articles thereon.

However, the articles can be hardly reliably hung on the above hanging hook, U-shaped rack or telescopic hanging rack and are likely to drop therefrom, especially when the hanging rack is placed in a moving object such as a car. The hung articles often drop due to swinging. Moreover, it is hard to mount the conventional telescopic hanging rack on the car.

SUMMARY OF THE INVENTION

It is therefore a primary object of the present invention to provide a telescopic hanging rack composed of a first bar, a second bar nested in the first bar and a coupling unit for firmly coupling the first and second bars. A press member is disposed in the coupling member. When adjusting the length of the telescopic hanging rack, the press member can be easily pressed and then resiliently restore. An engaging plate is disposed in the coupling unit for preventing the first and second bars from departing from each other due to over-pulling.

It is a further object of the present invention to provide the above telescopic hanging rack in which the first and second bars are formed with locating ribs cut with notches for adjustably fixing the hanging rack at a certain length. In addition, the notches restrict the articles hung on the hanging rack, whereby the articles can be tidily hung and are prevented from displacing or dropping due to swinging.

The present invention can be best understood through the following description and accompanying drawings wherein:

BRIEF DESCRIPTION OF THE DRAWINGS

FIGS. 4A and 4B show the adjustment of the hanging hook of the present invention;

FIGS. 7A and 7B show that the engaging plate of the present invention prevents the first and second bars from departing from each other due to over-pulling.

DETAILED DESCRIPTION OF THE PREFERRED EMBODIMENT

Figure 1:
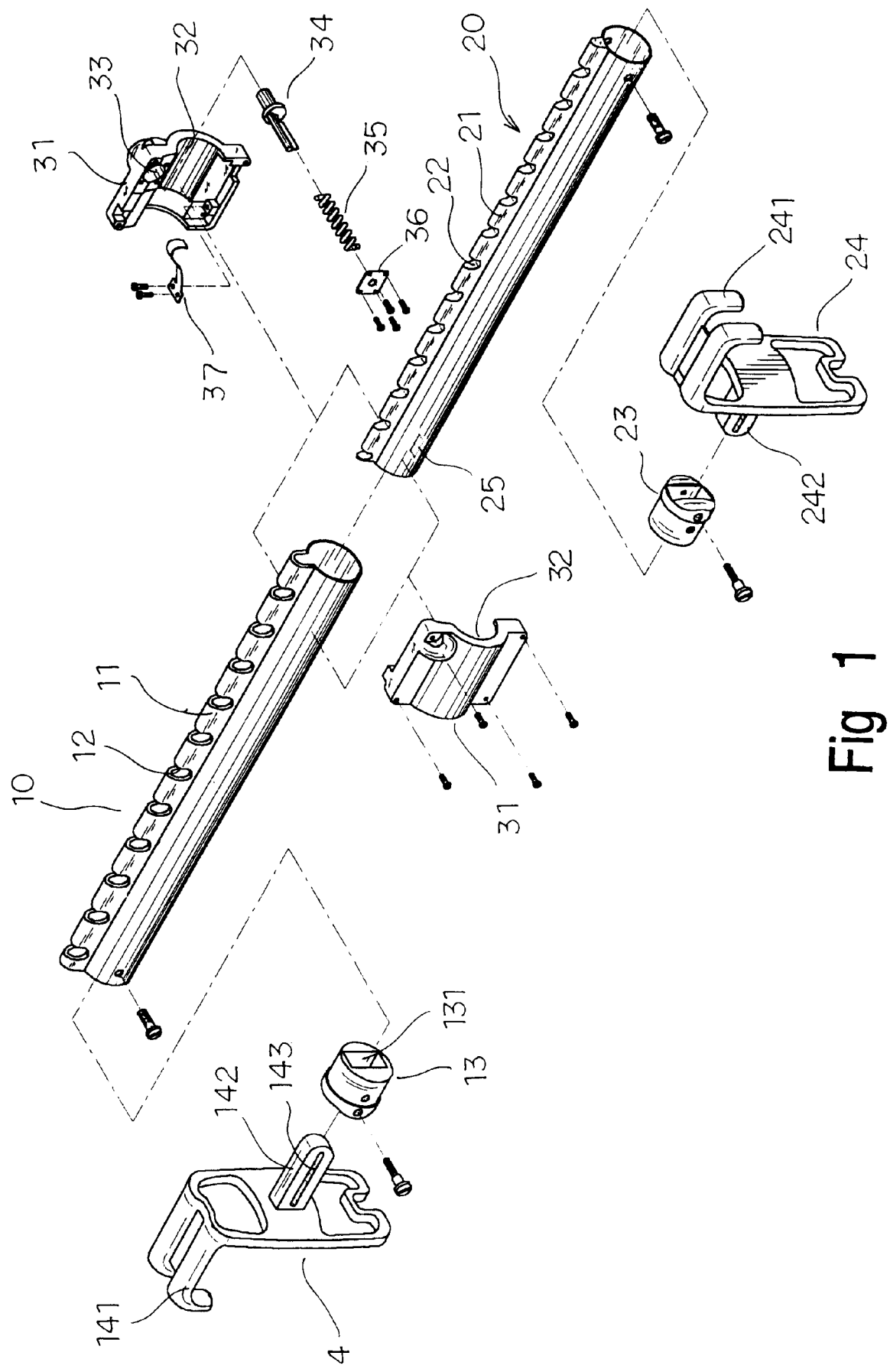
FIG. 1 is a perspective exploded view of the present invention.
Figure 2:
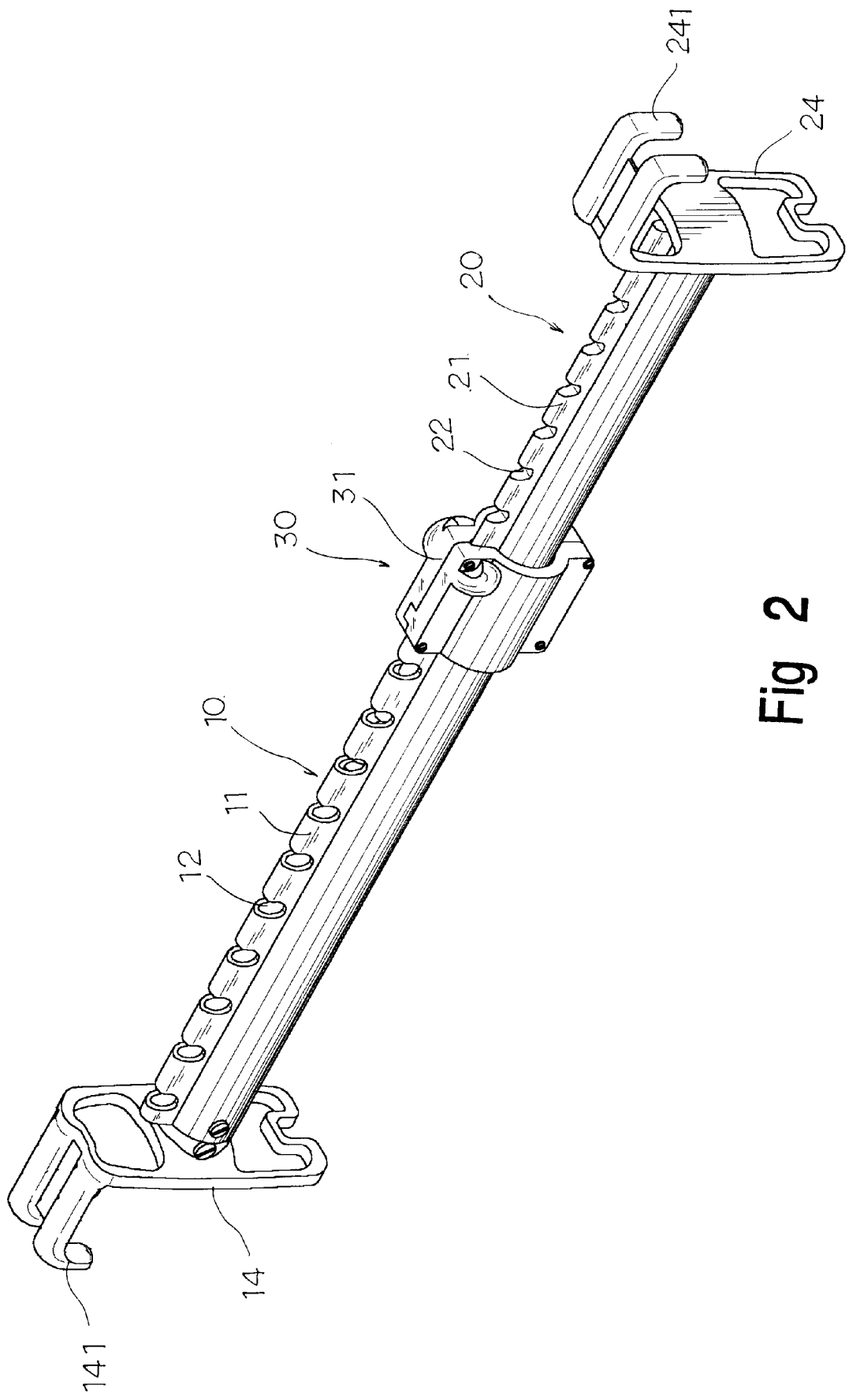
FIG. 2 is a perspective assembled view of the present invention.
Figure 3:
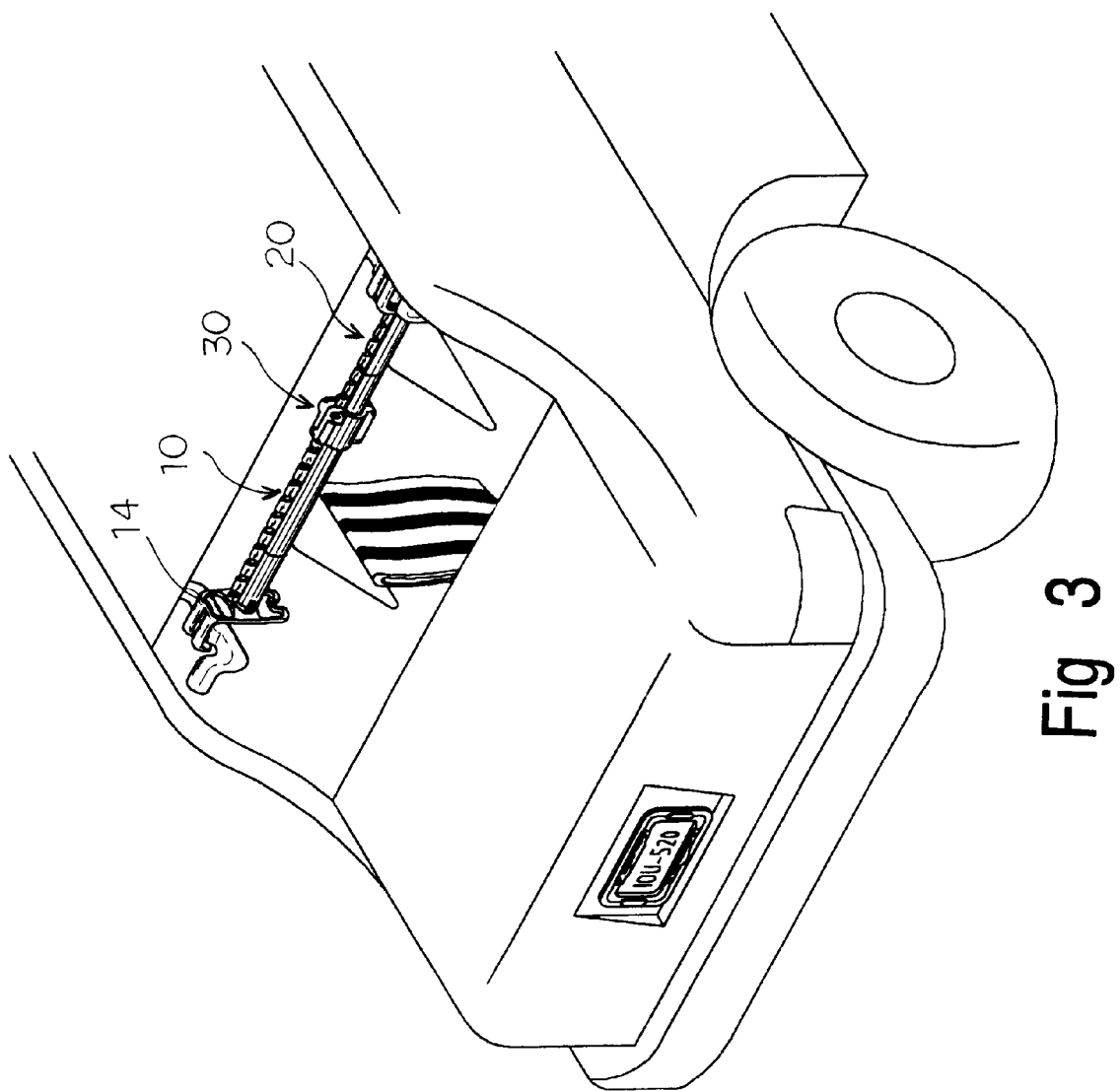
FIG. 3 shows that the telescopic hanging rack of the present invention is mounted in a car.

Please refer to FIG. 1. The telescopic hanging rack of the present invention includes a first bar 10, a second bar 20 nested in the first bar 10 and a coupling unit 30.

The first bar 10 is a metallic hollow circular rod. The outer face of the first bar 10 is formed with an axial locating rib 11. The locating rib 11 is cut with multiple notches 12 at equal intervals. One end of the first bar 10 is connected with a hanging hook 14 via a circular adapter 13. The hanging hook 14 has a hook section 141 and a projecting arm 142 formed with a slot 143. The adapter 13 is formed with a through hole 131. The projecting arm 142 is fitted into the through hole 131 and a screw is passed through the adapter 13 and the slot 143 to pivotally and extensibly connect the hanging hook 14 with the adapter 13. The adapter 13 is further locked in the first bar 10 by a screw without detachment, whereby the hanging hook 14 is extensible and rotatable relative to the first bar.

The second bar 20 is also a metallic hollow circular rod having a diameter slightly smaller than that of the first bar 10 and can be nested thereinto. The outer face of the second bar 20 is formed with an axial locating rib 21. The locating rib 21 is cut with multiple notches 22 at equal intervals. One end of the second bar 20 is connected with a hanging hook 24 via an adapter 23. The hanging hook 24 has a hook section 241 and a projecting arm 242. In addition, a lower side of the wall of the second bar 20 is formed with a perforation 25 near the inner end thereof.

Figure 5:
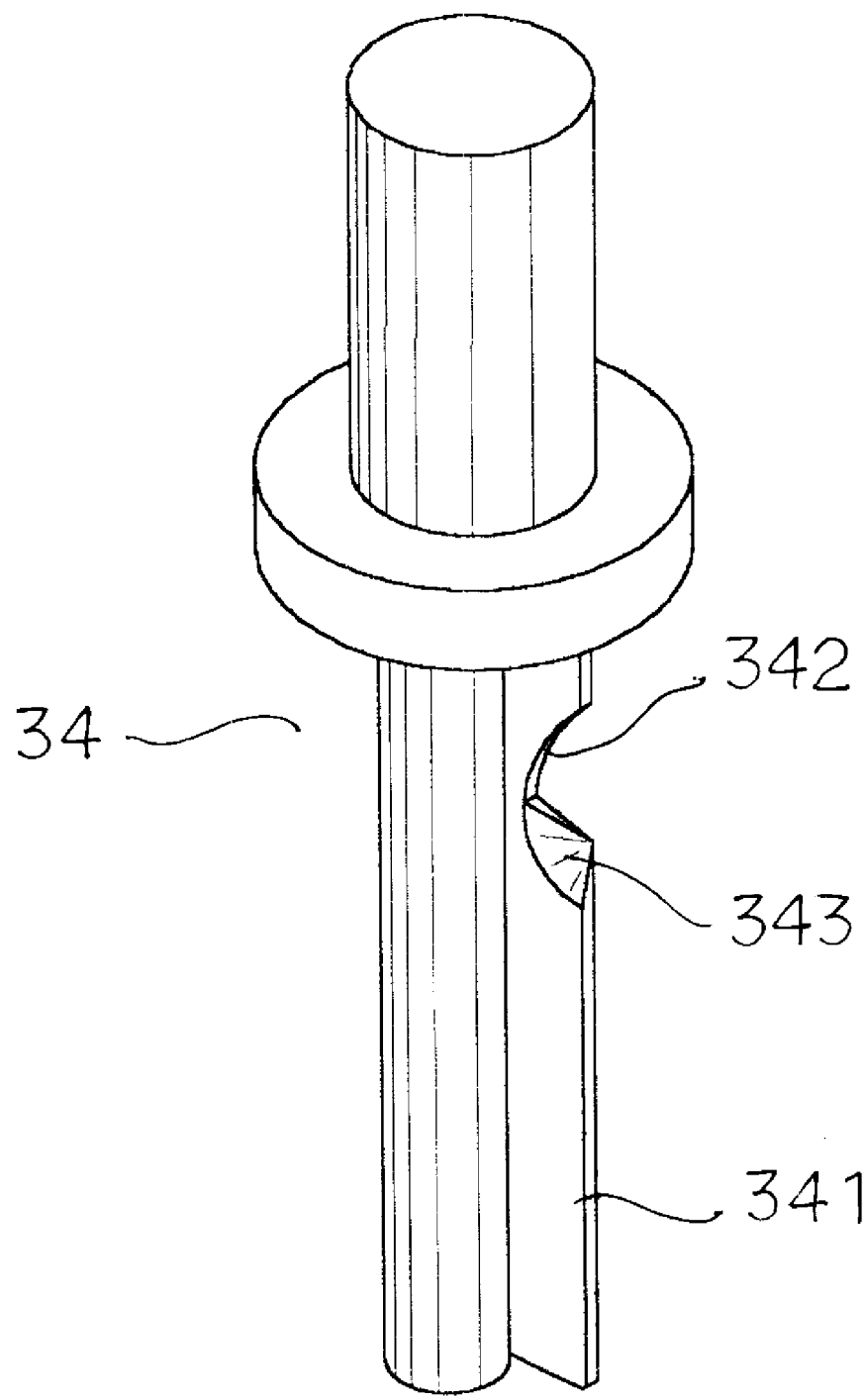
FIG. 5 is a perspective view of the press member of the present invention.
Figure 6:
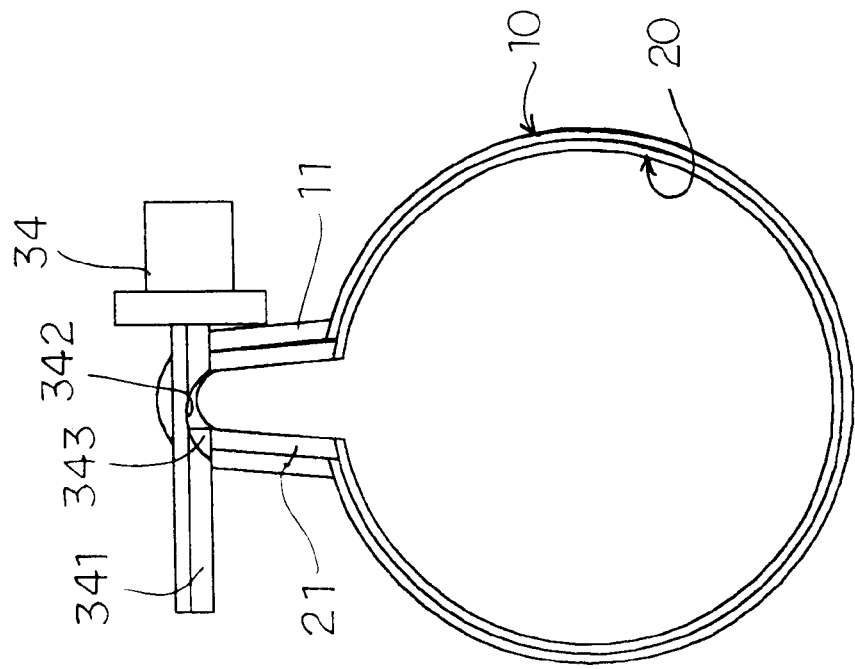
FIGS. 6A and 6B show that the length of the present invention is adjusted by means of pressing the press member.
Figure 6:
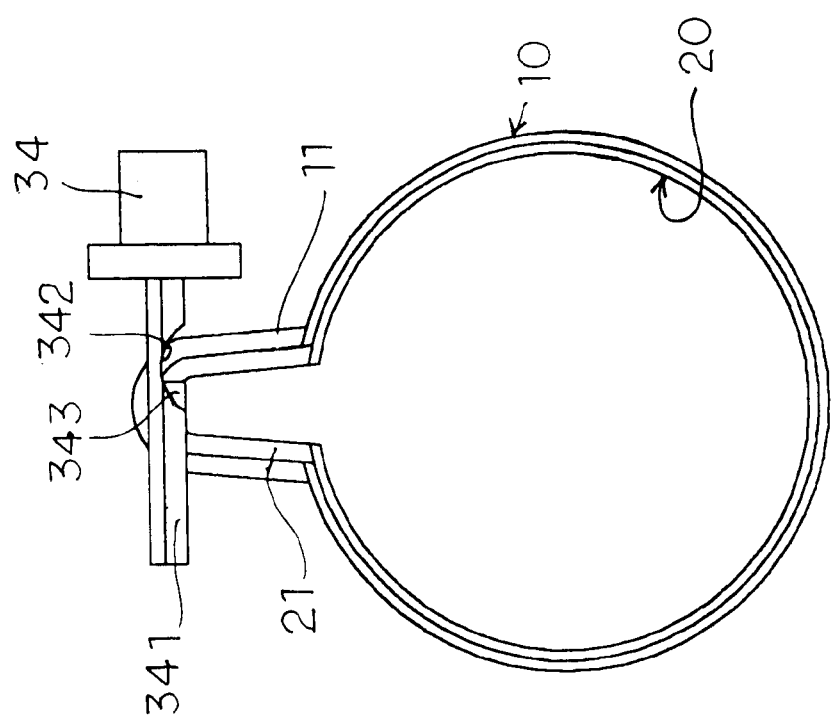

The coupling unit 30 is composed of a left and a right casings 31 mated with each other. Screws are screwed into the corners of the casings to lock the same together. The inner wall faces of the left and right casings 31 are respectively formed with two-stage recesses 32 with different curvatures. After the first and second bars 10, 20 are fitted with each other, the first and second bars 10, 20 are firmly inserted and located in the left and right casings 31. A corner of each of the left and right casings 31 is formed with a through hole 33 in which a press member 34 fitted with a resilient member 35 is disposed. The resilient member 35 via a stop plate 36 is located in each of the left and right casings 31. The press member 34 can be pressed and resiliently restore. As shown in FIG. 5, one end of the press member 34 is for a user's hand to press. The lower end of the press member 34 is integrally formed with a projecting slat 341. The upper portion of the slat 341 is formed with an arched notch 342. The lower half of the arched notch 342 is formed with a slope 343 inclined from one side of the slat 341 toward the opposite side. In addition, the inner wall face of the corner of the casing 31 opposite to the press member 34 is disposed with a hook-like arched engaging plate 37. One end thereof is fixed by screws. The other end thereof can extend into the perforation 25 of the second bar 20. When the first and second bars 10, 20 are totally extended, the engaging plate 37 serves to prevent the same from departing from each other.

Please refer to FIGS. 3, 4, 6 and 7. In use, the first and second bars 10, 20 are first extended to a desired length and located. Then, the hanging hooks 14, 24 of outer ends of the first and second bars 10, 20 are hung on a certain position to form a bridge. The hanging hooks 14, 24 themselves are rotatable and extensible so that the telescopic hanging rack can be easily hung. Referring to FIGS. 4A and 4B, after hung, a user can hang a clothes or a towel on the hanging rack. The locating ribs 11, 21 and the notches 12, 22 serve to adjustably locate the hanging rack at a certain length. In addition, they restrict the hung articles to locate the same. Therefore, the articles can be tidily hung and are prevented from displacing or dropping due to swinging. Moreover, as shown in FIGS. 6A and 6B, by means of lightly pressing the press member 34, the first and second bars 10, 20 can be adjusted in length. In addition, in order to avoid the separation of the first and second bars 10, 20 due to improper pulling or over-pulling, the engaging plate 37 is disposed in the coupling unit 30, whereby when the hanging rack is extended to the bottom, the engaging plate 37 will extend into the perforation 25 of the second bar 20 to abut again the same as shown in FIGS. 7A and 7B.

The above telescopic hanging rack of the present invention can be quickly and easily adjusted in length and can prevent the hung articles from displacing or dropping.

The above embodiment is only used to illustrate the present invention, not intended to limit the scope thereof. Many modifications of the above embodiment can be made without departing from the spirit of the present invention.

What is claimed is:

1. A telescopic hanging rack structure comprising:

a first bar, an outer face of the first bar being formed with a first axial locating rib which is cut with a plurality of first notches that are spaced apart at equal intervals, one end of the first bar being connected with a first hanging hook via a circular adapter;

a second bar nested in the first bar, an outer face of the second bar being formed with a second axial locating rib which is cut with a plurality of second notches that are spaced apart at equal intervals, one end of the second bar being connected with a second hanging hook via an adapter; and a coupling unit comprised of a left casing and a right casing mated and locked with each other by screws, inner wall faces of the left and right casings being respectively formed with recesses, whereby after the first and second bars are fitted together, the first and second bars are firmly inserted and located in the left and right casings, a corner of each of the left and right casings being formed with a through hole in which a press member fitted with a resilient member is disposed, the resilient member via a stop plate being located in the casings, whereby the press member is adapted to be pressed and resiliently restored to its condition prior to being pressed to lock and unlock the left and right casings to one another.

2. The telescopic hanging rack structure as claimed in claim 1, wherein each of the hanging hooks has a hook section and a projecting arm formed with a slot, each of the adapters being formed with a through hole, the projecting arm being fitted into the through hole of a respective one of the adapters, and a screw being passed through the adapter and the slot to pivotally and extensibly connect the hanging hook with the adapter, whereby the hanging hooks are extensible and rotatable relative to the first bar.

3. The telescopic hanging rack structure as claimed in claim 1, wherein a lower side of the outer face of the second bar is formed with a perforation near an inner end thereof and an engaging plate is disposed in the first and second casings, one end of the engaging plate being fixed by screws, the other end thereof being able to extend into the perforation of the second bar, whereby when the first and second bars are telescopically extended, the engaging plate prevents the first and second bars from separating from each other.

4. The telescopic hanging rack structure as claimed in claim 1, wherein one end of the press member is adapted for being pressed, a lower end of the press member being integrally formed with a projecting slat, an upper portion of the slat being formed with an arched notch, a lower half of the arched notch being formed with a slope inclined from one side of the slat towards the opposite side thereof.

* * * * *